Oct. 2, 1962 — R. A. MAGLIO ETAL — 3,056,663
CATALYST DECOMPOSITION CHAMBER
Filed June 15, 1959
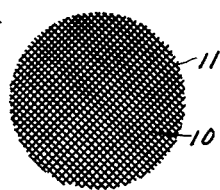
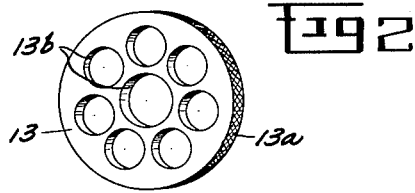
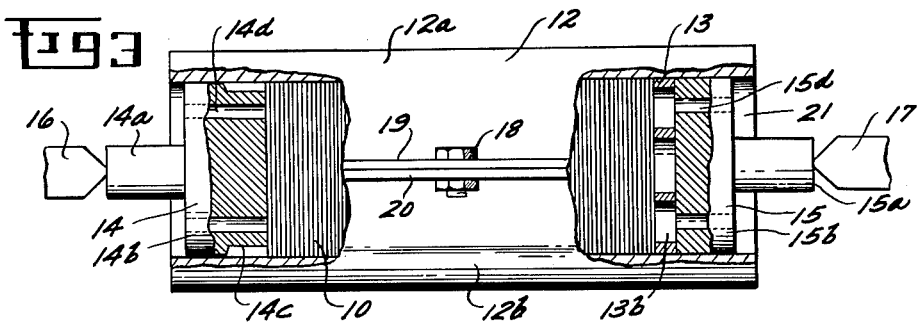
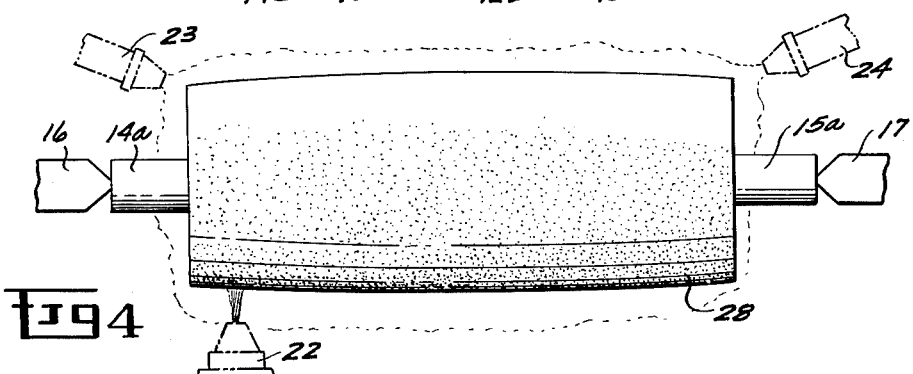
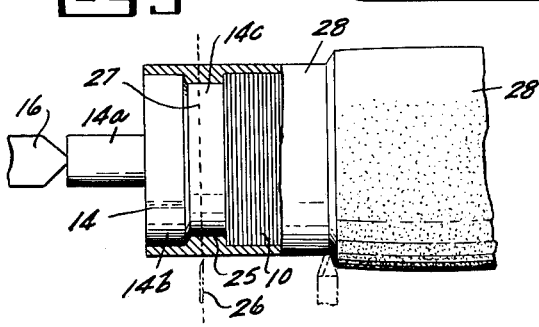
INVENTORS.
ROBERT A. MAGLIO
WARREN A. POOLE
BY Lawrence G. Norris
ATTORNEY—

United States Patent Office 3,056,663
Patented Oct. 2, 1962

3,056,663
CATALYST DECOMPOSITION CHAMBER
Robert Anthony Maglio, Beverly, and Warren Arthur Poole, Lynnfield, Mass., assignors to General Electric Company, a corporation of New York
Filed June 15, 1959, Ser. No. 820,497
2 Claims. (Cl. 23—288)

Our invention relates to catalyst beds, and is particularly applicable to catalyst beds of the type utilizing a number of series disposed meshes or screens arranged in the path of a fluid, such as hydrogen peroxide, which is caused to decompose as it passes through the catalyst bed.

Catalyst beds of the foregoing general type, sometimes called catalyst decomposition chambers, are utilized in auxiliary power units for missiles and aircraft for the purpose of causing decomposition of a monofuel such as hydrogen peroxide, the products of decomposition then being utilized to drive a gas turbine or other prime mover to supply output power from the unit. When the fuel employed is hydrogen peroxide, the catalyst which is normally used in the decomposition chamber is silver. It has been found convenient in at least one application involving hydrogen peroxide as a fuel and silver as the decomposition catalyst, to form the silver into disks of mesh or screen and stack these disks in series with each other in the flow path of the hydrogen peroxide.

A number of problems were encountered, however, with catalyst beds formed in the foregoing manner. It was found, for instance, that severe heat concentrations or hot spots developed within the bed. These hot spots were so severe as to seriously limit the maximum permissible inlet temperature at which the hydrogen peroxide fuel could be delivered to the catalyst bed. Although the hot spot problem was considered the most serious, various other problems were also encountered. For instance, problems of mechanical handling and stacking of the disks were involved as well as problems of controlling the fuel flow through the disks without significant leakage through the bed of undecomposed fuel.

In view of the foregoing it is an object of our invention to provide an improved catalyst bed construction which is not subject to the foregoing disadvantages.

It is another object of our invention to provide a catalyst bed which is formed of a unitary structure and which may be handled, installed and replaced as a single element.

Briefly stated, we accomplish these and other objects of our invention, in one form thereof, by providing a catalyst bed of a unitary structure formed of a number of series flow disposed screens, formed of the catalyst material, together with an outer casing in which the strands protuding from the outer edges of the screen disks are imbedded to provide a heat flow path between the screens and the casing of relatively high thermal conductivity. The outer casing is preferably formed of a material having a high thermal conductivity so that heat generated in the screens is conducted through the casing to equalize the temperature distribution throughout the bed and eliminate hot spots. The integrally formed outer casing also prevents end flow around the screens and thus restricts fuel flow to a path through the screens of catalytic material. In a silver catalyst bed utilizing the foregoing construction, we form the outer casing by spraying molten silver around the outer periphery of a stack of silver screens with the screens being preferably held in compression against each other during the process in order to provide face to face contact between the screens and thus still further facilitate heat transfer through the bed. Also formed integrally with the bed is an end plate located on the discharge end of the bed to add to the rigidity of the structure at the higher temperature discharge end of the bed. Upon completion of the operation of spraying molten silver around the periphery of the stacked; silver screens, the outer surface of the sprayed silver is machined to finished dimensions.

Our invention will be more fully set forth, together with other objects and advantages thereof, in the following description taken in connection with the accompanying drawing, in which:

FIG. 1 is an end view of a silver catalyst screen of the type used in the embodiment of our invention presented herein;

FIG. 2 is a perspective view of the end plate located at the discharge end of the catalyst bed;

FIG. 3 is a cross sectional view of a stack of silver screens mounted in associated fixturing in preparation for the spraying of molten silver thereon;

FIG. 4 is a plan view of the stack of FIG. 3, illustrating the build-up of the silver coating thereon during the metal spraying operation;

FIG. 5 illustrates the final machining operations performed after the metal spraying step has been completed; and FIG. 6 is a perspective view of the completed catalyst bed, the illustration being broken in the center to show both ends of the structure.

Referring now to FIG. 1 there is shown a disk 10 of circular shape formed of a mesh or screen of chemically pure silver strands or wires 11. The disk 10 is one of a number of like elements which, stacked side by side, form a catalyst bed for the decomposition of hydrogen peroxide. The hydrogen peroxide, flowing in a direction normal to the disks 10 and through the successive meshes presented thereby, is caused to decompose by the catalytic action of the silver of which the disks are formed.

As is well known to those skilled in the art, the decomposition reaction mentioned above is accompanied by the generation of heat. In addition it has been found that in a typical case, as the decomposition reaction occurs within the catalyst bed, the resulting flow turbulence and other contributing factors cause concentrations in the reaction to occur resulting in the generation of hot spots or areas of heat concentration within the catalyst bed. We propose a catalyst bed construction and method of manufacture therefor where the limiting effects of such heat concentrations are minimized.

In carrying out our invention we construct a catalyst bed formed of a series of silver screens 10 by stacking the screens in series flow relationship in a stacking fixture 12 as shown in FIG. 3. At one end of the stack there is placed a silver end piece 13 which has a number of openings 13b formed therein to allow discharge of the products of decomposition of hydrogen peroxide from the bed. The stack of silver screens 10 and the end piece 13 are held between two plugs 14 and 15 as shown in FIG. 3. The plugs 14 and 15 are provided with shaft portions 14a and 15a for accommodating the support of the stacked assembly between lathes spindles 16 and 17 or similar support means capable of allowing rotation of the stack about a preselected centerline for purposes which will later be described. The spindles 16 and 17 engage lathe centers provided in the ends of the shaft portions 14a and 15a.

The stacking fixture is formed of two separate parts 12a and 12 which are separate from each other and which may be clamped together in any suitable manner such as by means of bolts 18 extending flange portions 19 and 20 on the parts 12a and 12b. The two halves 12a and 12b of the stacking fixture made together to form an inner cylindrical bore 21 which is approximately the same diameter as that of the silver disk 10 and which forms a guide service for aligning the elements of the stack including the silver screens 10, the end piece 13 and the end plugs 14 and 15. The assembly shown in FIG. 3 may be conveniently formed by stacking the elements shown in one half of the stacking fixture 12 and then clamping the other half of the fixture in place after the elements have been stacked in the order shown.

The end plugs 14 and 15 are provided with cylindrical guide surfaces 14b and 15b which mate with the inner guide bore 21 of the stacking fixture thereby aligning the centerline of the stack with the end shafts 14a and 15a to provide alignment with the lathe spindles 16 and 17. Upon the assembly of the elements within the stacking fixture 12 as shown, the complete assembly is mounted between the lathe spindles 16 and 17 so that the entire assembly may be rotated along the axis of rotation established by spindles 16 and 17. By reason of the alignment established by the mating fit between the guide bore 21 of the stacking fixture and the cylindrical surfaces 14b and 15b on the end plugs 14 and 15 as well as with the outer peripheries of the silver disk 10 and the end piece 13, the alignment of the stack relative the lathe centers in the end shafts 14a and 15a is established.

After the stacking fixture containing the stacked assembly as shown in FIG. 3 is mounted between the rotatable spindles 16 and 17 as shown, one or both of the spindles is moved axially toward the other to place the stack under compression. The amount of compressive force required is not critical but should be sufficient to hold the stack in place upon the removal of the stacking fixture. We have also found that the compressive force ensures face to face contact between the screen element 10 and between the end piece 13 and its adjacent screen element which provides for better heat transfer longitudinally of the stack.

After the assembly of FIG. 3 is mounted between the spindles 16 and 17 and the desired amount of compressive force is applied to the stack, the stacking fixture 12 is removed from the stack. This leaves the stack of elements comprising silver screens 10, the end piece 13 and the end plug 14 and 15 supported between the spindles 16 and 17 in the alignment established by the stacking fixture. The assembly is then rotated by rotating the spindles 16 and 17 and molten silver is sprayed along the outer surface of the stack from a spray gun 22 as shown in FIG. 4. The spindles 16 and 17 may be rotated at any convenient speed consistent with the application of a reasonably uniform coating of silver around the stacked assembly. As the assembly is rotated on the spindles 16 and 17, the spray gun 22 is moved laterally back and forth to insure the application of the uniform wear of silver. Although any speed may be selected we have found that a rotational speed of approximately 45 r.p.m. coupled with a traverse speed of a silver spray gun 22 of one to five inches per second provides good results.

Throughout the spraying process the assembly is kept immersed in an inert gas such as argon which is caused to flow around the assembly from the nozzles 23 and 24 located in the vicinity. The blanket of inert gas prevents oxidation during the spraying process. The end plugs are provided with apertures 14d and 15d to allow the gas to circulate through the stack of silver screens.

The assembly is sprayed with molten silver until full coverage of all exposed portions of the stack is obtained and an outer casing 28 is formed. It will be appreciated that as the silver is deposited the protruding portions of the wires or strands 11 extending from the outer peripheries of the disk 10 become imbedded in the silver casing 28 to form an integral structure therewith. The end piece 13 is provided with a knurled surface 13a around its outer periphery as shown in FIG. 2, the protrusions on the knurled surface also becoming imbedded in the silver casing as it is deposited in molten form. The outer surfaces of the end plugs 14 and 15 are also preferably specially treated as will be described later in connection with the final machining operation.

As will be seen in FIGS. 3 and 5 the end plug 14 is provided with a second outer surface 14c which is generally co-axial with and smaller in diameter than the guide surface 14b. It will be observed that as the silver casing 28 is deposited on the stack, the annular depression formed by the difference in diameters between the surfaces 14b and 14c is filled with deposited silver. Upon completion of the silver spraying operation, the outer diameter of the assembly is machined to the desired dimension. In optimizing the silver deposition portion of the process, it is important to achieve a thickness of deposited silver which is sufficient to provide structural integrity to the assembly, but which, on the other hand, requires a minimum of finish machining. It will be noted by reference to FIG. 5 that the deposited silver filling the annulus created by the surface 14c forms a lip 25 which extends over the edge of the stack of screens 10.

After machining the outer diameter of the casing to the desired value, the ends of the stack are trimmed by means of a cutting tool 26 and the plugs 14 and 15 are removed. In order to facilitate removal of the end plugs 14 and 15 and in order to insure the proper integrity of the support provided by the plugs during the machining operations, we prefer to treat the outer surfaces of the plugs in a manner now to be described.

Except for the portion of the surface 14c on the plug 14 extending to the right approximately from the cutting line 27 and underlying the lip portion 25 which remains after the end cut is made, the outer surfaces 14b and 14c of plug 14 and the surface 15b on the plug 15 are grit-blasted or similarly treated to produce a mild degree of surface roughness. We have found that this treatment provides the desired degree of gripping action between the plug surfaces and deposited silver casing to permit the machining operations described to be carried out with the proper degree of structural support from the end plugs 14 and 15.

Although the treatment just described is not essential, we have found that some sort of surface treatment of this kind is desirable from the standpoint of enhancing the structural support provided by the plugs 14 and 15 in the machining operations just described. No such treatment is applied, however, to the right hand extremity of the surface 14c which extends approximately from the cutting line 27 because from the standpoint of facilitating removal of the plug gripping action between this portion of the plug surface and the lip 25 is not desired. Thus after the edge cut along the line 27 is made, the plug 14 may be slipped axially out of contact with the lip 25 and removed from the unit without damaging the lip portion. At the opposite end of the unit the edge cut is made approximately at the plane where the plug 15 engages the end piece 13 so that upon completion of the operation the end piece 13 is approximately flush with the edge of the casing as shown in FIG. 6.

Thus a single unitary structure is provided, being defined at its axial extremity on one end by the over-hanging lip portion 25 and on the other end by the end piece 13, the outer periphery of which is imbedded in the silver casing 28. The outer periphery of each of the silver screens 10 is also imbedded in silver casing and the adjacent screens are held together in face to face contact to facilitate heat transfer between adjacent screens. The provision of the outer casing 28 in intimate heat transfer relationship with the outer peripheries of the screens 10 provides a heat flow path of high thermal conductivity between the screens and the casing and along the casing. Thus, heat concentrations within the bed are rapidly dissipated and the maximum temperature capability of the bed is significantly improved. For example, we have found that in a catalyst bed arrangement wherein a series of silver screens were merely stacked in series flow relationship in an outer casing, the maximum inlet temperature at which the bed was capable of operating in the decomposition of hydrogen peroxide without burn-out was about 115 degrees F. However, with a bed of the same size, but of a construction of the kind described herein and manufactured by the process disclosed, satisfactory operation in the same application was obtained without burn-out with inlet temperatures ranging up to 150 degrees F. We have also found that the construction of our invention eliminates end leakage which would otherwise occur around the peripheral edges of the silver disks so that the operation of our arrangement is more efficient as a decomposition catalyst bed.

It will be appreciated, of course, that the outer casing 28 may be formed in other ways than by the method described herein, one of the more important features in the construction being that the casing and the screens are integrally secured together with the outer peripheries of the screens in intimate heat transfer relationship with the casing. It will be recognized that the provision of an outer casing of high thermal conductivity in intimate heat transfer relationship with the outer peripheries of the stacked screens may be achieved in other ways such as by bonding or otherwise integrally securing the outer peripheries of the screens to the casing, although we prefer the deposition method set forth herein.

Although we have shown and described a particular embodiment of our invention for the purpose of making a full and complete disclosure thereof, it will be appreciated that the scope of our invention is not limited to the particular embodiment selected for purposes of description thereof and that various modifications, changes and substitutions may be made in the structure and methods set forth without departing from the true scope and spirit of our invention as defined in the appended claims.

What we claim as new and desire to secure by Letters Patent is:

1. A catalyst decomposition chamber comprising: an outer metallic casing having
    (a) an inlet end to receive a fluid,
    (b) a discharge end to discharge products of decomposition,
    (c) the outer casing defining the radial limits of flow through the chamber;
and a plurality of mesh screens
    (a) formed of a high thermal conductivity catalytic material, and
    (b) arranged between the ends of the casing in series flow relationship to the direction of flow through the chamber,
    (c) the outer periphery of each of the mesh screens being imbedded in the outer casing in intimate heat transfer relationship therewith to form a part of the casing as a result of solidification of the metallic casing around the periphery of the mesh screens.

2. A catalyst decomposition chamber comprising: an outer silver casing having
    (a) an inlet end to receive hydrogen peroxide,
    (b) a discharge end including a silver end piece, the end piece having at least one aperture forming a discharge opening for the products of decomposition of the hydrogen peroxide,
    (c) the outer casing defining the radial limits of flow through the chamber;
and a plurality of silver mesh screens
    (a) arranged between the ends of the casing in series flow relationship to the direction of hydrogen peroxide flow through the chamber,
    (b) the outer periphery of each of the silver mesh screens being imbedded in the outer casing in intimate heat transfer relationship therewith to form a part of the casing as a result of solidification of the silver casing around the periphery of the mesh screens.

References Cited in the file of this patent

UNITED STATES PATENTS

| | | |
|---|---|---|
| 2,158,981 | Collins | May 16, 1939 |
| 2,190,548 | Pleydell | Feb. 13, 1940 |
| 2,274,198 | Congleton | Feb. 24, 1942 |
| 2,721,788 | Schad | Oct. 25, 1955 |
| 2,809,940 | Crum | Oct. 15, 1957 |
| 2,865,721 | Lane | Dec. 23, 1958 |
| 2,866,692 | Kautter | Dec. 30, 1958 |
| 2,887,456 | Halford et al. | May 19, 1959 |